US012654658B2

(12) United States Patent
  Pagni et al.

(10) Patent No.:  US 12,654,658 B2
(45) Date of Patent:      Jun. 16, 2026

(54) TANGENTIAL FORCE SENSOR FOR A BRAKE CALIPER

(71) Applicant: Divergent Technologies, Inc., Los Angeles, CA (US)

(72) Inventors: Marco Pagni, Los Angeles, CA (US); Joeri ter Hofstede, Torrance, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 118 days.

(21) Appl. No.: 18/612,991

(22) Filed: Mar. 21, 2024

(65) Prior Publication Data

US 2024/0317195 A1     Sep. 26, 2024

Related U.S. Application Data

(60) Provisional application No. 63/453,681, filed on Mar. 21, 2023.

(51) Int. Cl.
  B60T 8/171        (2006.01)
  B60T 8/172        (2006.01)
          (Continued)

(52) U.S. Cl.
  CPC .............. B60T 8/171 (2013.01); B60T 8/172 (2013.01); B60T 8/17616 (2013.01);
          (Continued)

(58) Field of Classification Search
  CPC ...... B60T 8/171; B60T 8/172; B60T 8/17616; B60T 17/22; F16D 2066/005; F16D 2066/006; G01L 5/28
          (Continued)

(56) References Cited

U.S. PATENT DOCUMENTS

| | | | |
|---|---|---|---|
| 5,203,226 A | 4/1993 | Hongou et al. | |
| 5,279,394 A | 1/1994 | Wollenweber et al. | |
| (Continued) | | | |

FOREIGN PATENT DOCUMENTS

| | | | |
|---|---|---|---|
| WO | 1996036455 A1 | 11/1996 | |
| WO | 1996036525 A1 | 11/1996 | |
| (Continued) | | | |

OTHER PUBLICATIONS

US 9,202,136 B2, 12/2015, Schmidt et al. (withdrawn)
          (Continued)

*Primary Examiner* — Erick R Solis
(74) *Attorney, Agent, or Firm* — ArentFox Schiff LLP

(57)         ABSTRACT

Disclosed herein are systems and methods for measuring force applied to brake calipers by brake pads by a sensor configured to be positioned between the caliper and the brake pad. The systems and methods herein may include a processor configured to receive output signals from the sensor and process the signals to generate data regarding the force applied to the caliper and determine a torque generated during braking. The systems and methods herein may include a second sensor that outputs signals representing measurements of a brake pressure, processes these signals to generate data regarding the brake pressure, and determines brake efficiency generated during braking. Additionally, the systems and methods herein can include a plurality of wheel apparatuses including the calipers and sensors disclosed herein.

27 Claims, 12 Drawing Sheets

(51) Int. Cl.

| | |
|---|---|
| *B60T 8/1761* | (2006.01) |
| *B60T 17/22* | (2006.01) |
| *F16D 66/00* | (2006.01) |
| *G01L 3/20* | (2006.01) |
| *G01L 5/28* | (2006.01) |

(52) U.S. Cl.
CPC .............. *B60T 17/22* (2013.01); *F16D 66/00* (2013.01); *G01L 3/20* (2013.01); *G01L 5/28* (2013.01); *B60T 2240/00* (2013.01); *F16D 2066/005* (2013.01); *F16D 2066/006* (2013.01)

(58) Field of Classification Search
USPC .......................................................... 701/70
See application file for complete search history.

(56) References Cited

U.S. PATENT DOCUMENTS

| | | | |
|---|---|---|---|
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |

(56) References Cited

U.S. PATENT DOCUMENTS

| | | | |
|---|---|---|---|
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |

(56) References Cited

U.S. PATENT DOCUMENTS

| | | | |
|---|---|---|---|
| 10,294,982 | B2 | 5/2019 | Gabrys et al. |
| 10,295,989 | B1 | 5/2019 | Nevins |
| 10,303,159 | B2 | 5/2019 | Czinger et al. |
| 10,307,824 | B2 | 6/2019 | Kondoh |
| 10,310,197 | B1 | 6/2019 | Droz et al. |
| 10,313,651 | B2 | 6/2019 | Trevor et al. |
| 10,315,252 | B2 | 6/2019 | Mendelsberg et al. |
| 10,336,050 | B2 | 7/2019 | Susnjara |
| 10,337,542 | B2 | 7/2019 | Hesslewood et al. |
| 10,337,952 | B2 | 7/2019 | Bosetti et al. |
| 10,339,266 | B2 | 7/2019 | Urick et al. |
| 10,343,330 | B2 | 7/2019 | Evans et al. |
| 10,343,331 | B2 | 7/2019 | McCall et al. |
| 10,343,355 | B2 | 7/2019 | Evans et al. |
| 10,343,724 | B2 | 7/2019 | Polewarczyk et al. |
| 10,343,725 | B2 | 7/2019 | Martin et al. |
| 10,350,823 | B2 | 7/2019 | Rolland et al. |
| 10,356,341 | B2 | 7/2019 | Holzer et al. |
| 10,356,395 | B2 | 7/2019 | Holzer et al. |
| 10,357,829 | B2 | 7/2019 | Spink et al. |
| 10,357,957 | B2 | 7/2019 | Buller et al. |
| 10,359,756 | B2 | 7/2019 | Newell et al. |
| 10,369,629 | B2 | 8/2019 | Mendelsberg et al. |
| 10,382,739 | B1 | 8/2019 | Rusu et al. |
| 10,384,393 | B2 | 8/2019 | Xu et al. |
| 10,384,416 | B2 | 8/2019 | Cheung et al. |
| 10,389,410 | B2 | 8/2019 | Brooks et al. |
| 10,391,710 | B2 | 8/2019 | Mondesir |
| 10,392,097 | B2 | 8/2019 | Pham et al. |
| 10,392,131 | B2 | 8/2019 | Deck et al. |
| 10,393,315 | B2 | 8/2019 | Tyan |
| 10,400,080 | B2 | 9/2019 | Ramakrishnan et al. |
| 10,401,832 | B2 | 9/2019 | Snyder et al. |
| 10,403,009 | B2 | 9/2019 | Mariampillai et al. |
| 10,406,750 | B2 | 9/2019 | Barton et al. |
| 10,412,283 | B2 | 9/2019 | Send et al. |
| 10,416,095 | B2 | 9/2019 | Herbsommer et al. |
| 10,421,496 | B2 | 9/2019 | Swayne et al. |
| 10,421,863 | B2 | 9/2019 | Hasegawa et al. |
| 10,422,478 | B2 | 9/2019 | Leachman et al. |
| 10,425,793 | B2 | 9/2019 | Sankaran et al. |
| 10,427,364 | B2 | 10/2019 | Alves |
| 10,429,006 | B2 | 10/2019 | Tyan et al. |
| 10,434,573 | B2 | 10/2019 | Buller et al. |
| 10,435,185 | B2 | 10/2019 | Divine et al. |
| 10,435,773 | B2 | 10/2019 | Liu et al. |
| 10,436,038 | B2 | 10/2019 | Buhler et al. |
| 10,438,407 | B2 | 10/2019 | Pavanaskar et al. |
| 10,440,351 | B2 | 10/2019 | Holzer et al. |
| 10,442,002 | B2 | 10/2019 | Benthien et al. |
| 10,442,003 | B2 | 10/2019 | Symeonidis et al. |
| 10,449,696 | B2 | 10/2019 | Elgar et al. |
| 10,449,737 | B2 | 10/2019 | Johnson et al. |
| 10,461,810 | B2 | 10/2019 | Cook et al. |
| 2003/0111305 | A1 | 6/2003 | Drennen et al. |
| 2006/0108783 | A1 | 5/2006 | Ni et al. |
| 2007/0024113 | A1* | 2/2007 | Thrush .................... F16D 66/00 |
| | | | 303/155 |

| | | | |
|---|---|---|---|
| 2014/0277669 | A1 | 9/2014 | Nardi et al. |
| 2017/0113344 | A1 | 4/2017 | Schönberg |
| 2017/0267220 | A1 | 9/2017 | Serra et al. |
| 2017/0341309 | A1 | 11/2017 | Piepenbrock et al. |
| 2019/0351889 | A1 | 11/2019 | Serra et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Ester Olmeda et al., "Development and Characterization of a Compact Device for Measuring the Braking Torque of a Vehicle," Department of Mechanical Engineering, Universidad Carlos III de Madrid, Avda. de la Universidad 30, 28911 Leganés, Spain, Sensors 2020, 20(15), 4278, available at [https://www.mdpi.com/1424-8220/20/15/4278].
International Search Report and Written Opinion received for PCT Patent Application No. PCT/US2024/021011, mailed on Aug. 22, 2024, 15 pages.

* cited by examiner

500

Plate
505

515

Brake
Pad
510a

Brake
Pad
510b

500

505

510a

515

Force
525

Direction 521

600

505

620

515

510b

510a

700

800

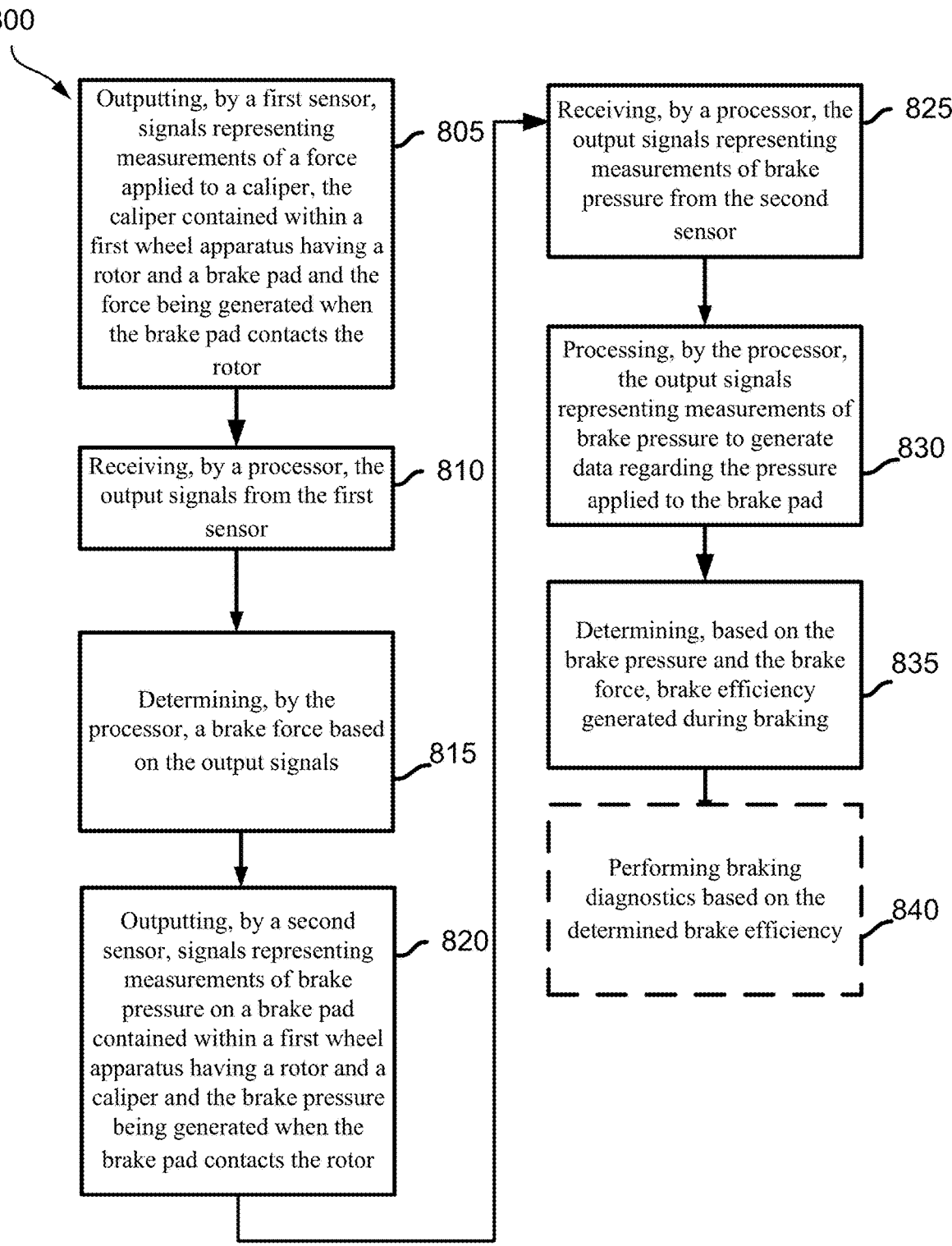

Outputting, by a first sensor, signals representing measurements of a force applied to a caliper, the caliper contained within a first wheel apparatus having a rotor and a brake pad and the force being generated when the brake pad contacts the rotor — 805

Receiving, by a processor, the output signals from the first sensor — 810

Determining, by the processor, a brake force based on the output signals — 815

Outputting, by a second sensor, signals representing measurements of brake pressure on a brake pad contained within a first wheel apparatus having a rotor and a caliper and the brake pressure being generated when the brake pad contacts the rotor — 820

Receiving, by a processor, the output signals representing measurements of brake pressure from the second sensor — 825

Processing, by the processor, the output signals representing measurements of brake pressure to generate data regarding the pressure applied to the brake pad — 830

Determining, based on the brake pressure and the brake force, brake efficiency generated during braking — 835

Performing braking diagnostics based on the determined brake efficiency — 840

FIG. 8

TANGENTIAL FORCE SENSOR FOR A BRAKE CALIPER

CROSS-REFERENCE TO RELATED APPLICATION

This application the benefit of, and right of priority to, U.S. Patent Application No. 63/453,681, entitled "Tangential Force Sensor for a Brake Caliper," filed Mar. 21, 2023, the contents of which are expressly incorporated by reference as if fully set forth herein.

BACKGROUND

Field

The present disclosure relates generally to braking systems and more particularly, to systems and methods concerning braking systems having sensors.

Background

Disc braking systems found in vehicles and other wheeled machines perform braking by clamping brake pads against a rotating element (e.g., a rotor) within a wheel apparatus. The frictional forces generated by clamping the brake pads against the rotating element produce braking torque that serves to slow rotation of the wheel and correspondingly the vehicle. Due to the nature and composition of friction materials, such brake torque highly depends on the operative conditions of the brakes, such as, for instance, components temperature, braking speed and clamping pressure. At the same time, braking torque can be generated also in off-braking conditions when no hydraulic pressure is supplied to the brake caliper, due to unintended rubbing of the brake pads against the rotor (i.e., residual drag torque). Torque caused by off-braking is detrimental to the fuel economy and/or range of the vehicle. In either case, understanding the actual braking torque being generated is key information to assess output, functionality and performance of the braking system.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, a braking system for a vehicle is provided. The system includes a caliper configured to house a brake pad adjacent a rotor. Additionally, the system includes a sensor configured to be positioned between the caliper and the brake pad and configured to output signals representing measurements of force applied to the caliper by the brake pad when the brake pad contacts the rotor. The sensor can be located at different locations in the braking system depending on the embodiment. For example, the sensor can be embedded in the caliper. In another example, the sensor is coupled to an outer surface of the caliper. In one or more embodiments, the force is measured by measuring elastic deformation of the caliper. In one or more embodiments, the brake pad is housed within the caliper.

In one or more embodiments, the system can further include a processor configured to receive the output signals from the sensor, process the output signals to generate data regarding the force applied to the caliper, and determine a torque generated during braking. In one or more embodiments, the processor is configured to determine the torque substantially in real-time. In one or more embodiments, the processor is further configured to review the determined torque generated during braking and control a brake pressure applied to the brake pad to reduce or increase the torque generated during braking.

In one or more embodiments, the system can include a second sensor configured to output signals representing measurements of a brake pressure, and further comprising a processor configured to receive the output signals representing measurements of brake pressure from the sensor, process the output signals representing measurements of brake pressure to generate data regarding the pressure applied to the caliper, and determine, based on the signals representing measurements of force and the signals representing measurements of brake pressure, a brake efficiency generated during braking. In one or more embodiments, the processor is configured to determine brake efficiency substantially in real-time.

In another aspect of the disclosure, a braking system for a vehicle is provided. The system includes a first wheel apparatus and a second wheel apparatus. Each of the first and second wheel apparatuses can include a caliper configured to house a brake pad adjacent a rotor. Further, each of the first and second wheel apparatuses can include a sensor configured to be positioned between the caliper and the brake pad and configured to output signals representing measurements of force applied to the caliper by the brake pad when the brake pad contacts the rotor.

In one or more embodiments, the system can further include a processor configured to receive the output signals from the sensor, process the output signals to generate data regarding the force applied to the caliper, and determine a torque generated during braking for each of the first and second wheel apparatuses. In one or more embodiments, the processor is further configured to compare the torque generated during braking for the first wheel apparatus to the torque generated during braking for the second wheel apparatus. In one or more embodiments, the processor is configured to determine the torque generated during braking for the first and second wheel apparatuses substantially in real-time.

In one or more embodiments, the system can include a second sensor configured to output signals representing measurements of a brake pressure at the first and second wheel apparatuses, and in which the processor is configured to receive the output signals representing measurements of brake pressure at the first and second wheel apparatuses from the second sensor, process the output signals representing measurements of brake pressure at the first and second wheel apparatuses to generate data regarding the pressure applied to the caliper at the at the first and second wheels, and determine, based on the signals representing measurements of force and the signals representing measurements of brake pressure, a brake efficiency of the at the first and second wheel apparatuses generated during braking. In one or more embodiments, the processor is further configured to compare the braking efficiency of the first wheel apparatus to the braking efficiency of the second wheel apparatus.

In another aspect of the disclosure, a method is provided. The method includes outputting, by a first sensor, signals representing measurements of a force applied to a caliper, the caliper contained within a first wheel apparatus having a rotor and a brake pad and the force being generated when the brake pad contacts the rotor. Further, the method includes receiving, by a processor, the output signals from the first sensor. The method can include determining, by the processor, a brake force based on the output signals. Additionally, the method includes determining, by the processor, a torque generated during braking at the first wheel apparatus, the torque being determined based on the brake force.

In one or more embodiments, the method further includes measuring, by the processor, elastic deformation of the caliper, wherein the brake force is determined based on the elastic deformation.

In one or more embodiments, the method can further include outputting, by a second sensor, signals representing measurements of a force applied to a caliper, the caliper contained within a second wheel apparatus having a rotor and a brake pad and the force being generated when the brake pad contacts the rotor. Additionally, the method can include receiving, by the processor, the output signals from the second sensor. Thereafter, the method can include determining, by the processor, a second brake force based on the output signals representing measurements of a force applied to the caliper contained within the second wheel apparatus. In one or more embodiments, the method can include determining, by the processor, a torque generated during braking at the first wheel apparatus, the torque being determined based on the first brake force. Further, the method can include determining, by the processor, a torque generated during braking at the second wheel apparatus, the torque being determined based on the second brake force. In one or more embodiments, the method can further include comparing, by the processor, the torque generated during braking at the first wheel apparatus to the torque generated during braking at the second wheel apparatus.

In one or more embodiments, the method can further include outputting, by a second sensor, signals representing measurements of brake pressure. Thereafter, the method can include receiving, by the processor, the output signals representing measurements of brake pressure from the second sensor. Additionally, the method can include processing, by the processor, the output signals representing measurements of brake pressure to generate data regarding the pressure applied to the brake pad. Further, the method can include determining, based on the brake pressure and the brake force, brake efficiency generated during braking. In one or more embodiments, the method can further include outputting, by a second sensor, signals representing measurements of wheel speed. Thereafter, the method can include receiving, by the processor, the output signals representing measurements of wheel speed from the second sensor. Additionally, the method can include determining a wheel lock up based on the wheel speed. Further, the method can include determining a maximum brake force based on the wheel lock up and the brake force. Moreover, the method can include controlling a brake pressure to apply the maximum brake force to the first wheel apparatus.

In one or more embodiments, the method can include increasing the brake pressure until a second wheel lock up is determined. Further, the method can include determining a second maximum brake force based on the second wheel lock up and the brake force. Additionally, the method can include controlling the brake pressure to apply the second maximum brake force to the first wheel apparatus.

It is understood that other aspects will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the concepts described herein will now be presented in the detailed description by way of example, and not by way of limitation, in the accompanying drawings, wherein:

FIG. 8 is a flowchart of an exemplary method of measuring brake pressure generated at a wheel apparatus during braking according to one or more embodiments herein.

DETAILED DESCRIPTION

Figure 1:
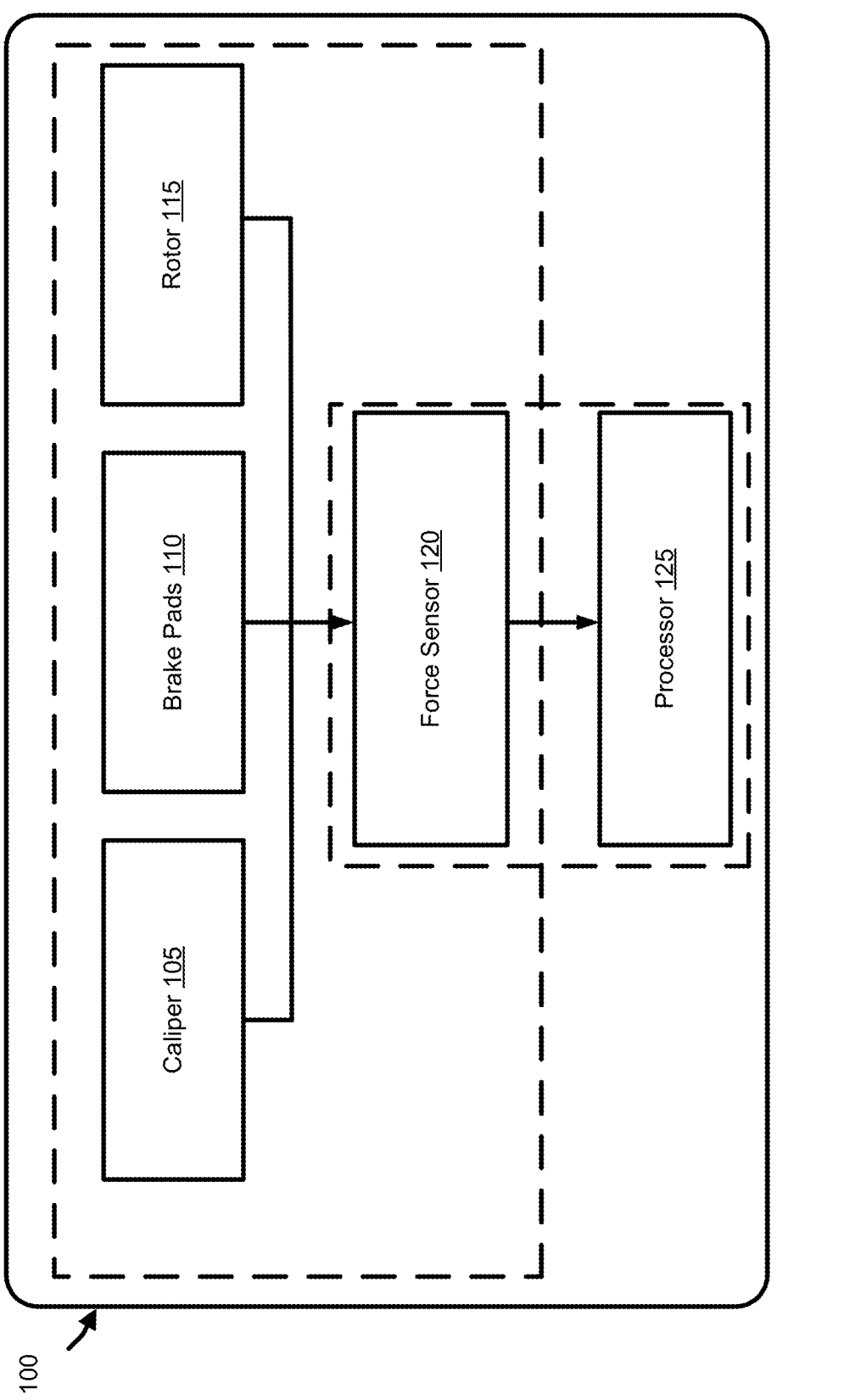
FIG. 1 illustrates an exemplary braking system according to one or more embodiments herein.

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, to avoid obscuring the various concepts presented throughout this disclosure.

When designing braking systems, it is valuable to be able to make direct physical measurements of components of the braking systems in order to perform diagnostics. For example, data relating to the forces acting on braking system components during use can be useful for determining load distribution, torque, braking efficiency, and component wear. Current braking systems lack direct ways to make these measurements, as these measurements are made by measuring devices like wheel force transducers and chassis dynamometers which must be located exterior to the braking system to operate.

The present disclosure is directed toward braking systems having sensor components that can measure the force exerted between brake caliper housing and brake pads in real time when the brakes are activated by the hydraulic circuit and can, for example, determine the dynamic braking torque being generated. The force applied to the caliper during braking is typically a tangential force, though other forces may be measured when determining torque or other physical properties relevant for braking diagnostics. In one or more embodiments, the braking systems disclosed herein include sensors that can measure torque generated by off-braking conditions.

Aspects of the present disclosure thus include sensors capable of measuring force that are coupled to, or integral with, a brake caliper or otherwise rigidly connected to the wheel carrier. For example, the sensor may be embedded in a load-sensing plate that is an integral part of the caliper housing that acts as a stopper for the brake pads without interfering with the traditional functioning of the braking system. However, the sensor is not required to be embedded in a load-sensing plate. For example, in one or more embodiments, the sensor may be positioned between the caliper and the brake pad or may be located in the caliper housing. The sensor can be located in any position where it can measure the force applied to the caliper when the brakes are activated by the driver or when the hydraulic circuit activates, causing the brake pads to contact the brake rotor. The elastic deformation of the portion of the caliper having the sensor under loading can be used to determine the amount of force being transmitted and therefore calculate the braking torque being generated.

Calculation of the generated torque is performed by an electronic processor configured to receive and process output signals from the sensor concerning the force applied to the caliper during braking. In one or more embodiments, the processor can be connected to the onboard central unit of the vehicle and used in combination with other signals received from the sensor (e.g., brake pressure, wheel speed/acceleration, longitudinal acceleration, etc.). Measuring force applied to the caliper and determining brake torque are useful measurements for supervising the health of the braking system as typically, it is difficult to know if brakes are failing or likely to malfunction until the failure or malfunction actually occurs. That is, these measurements can provide real-time guidance that failure or malfunction is impending.

Specifically, the processor may process these different classes of data for multiple purposes, such as for diagnostic purposes for brake efficiency (e.g., individual corner brake output), safety (e.g., brake fading or failure), health (quality checks on brake system, tires, road roughness, etc.), control loop feedback (e.g., active brake pressure actuation), non-operative off-braking (e.g., residual brake drag), or feedback to drivers (e.g., warnings or other information generated by these diagnostics). In some non-limiting examples, the processor can perform the one or more of the following exemplary diagnostics based on sensor signals received and processed:

engine/electronic control unit (ECU) feedback regarding brake efficiency based on measurements of brake torque and pressure;
  safety feedback regarding brake failure based on measurements of brake torque, pressure, and deceleration;

active control of brake pressure (e.g., hydraulic pressure applied to the brake pads) to individual corners based on torque vectoring;
  off-braking warnings when excessive residual drag is measured; and
  warning messages to vehicle operators when a braking system malfunction is detected.

With reference now to FIG. 1, FIG. 1 illustrates an exemplary braking system 100 according to one or more embodiments herein. The system 100 includes a caliper 105, one or more brake pads 110, and a rotor 115. In one or more embodiments, the caliper 105 is configured to house the brake pads 110. In one or more embodiments, the brake pads 110 are housed in the caliper 105. As a user initiates braking (e.g., via a vehicle pedal), hydraulic pressure (i.e., brake pressure) causes the brake pads 110 to contact the rotor 115. The frictional force generated by this contact causes the rotor to slow and tangential force to be delivered to the caliper 105.

A force sensor 120 is included in braking system 100 that is configured to output signals representing measurements of force applied to the caliper by the brake pad when the brake pad contacts a rotor during braking. Force can be measured by measuring elastic deformation, e.g., of the caliper 105 with the sensor 120, of the sensor 120 itself, etc. In one or more embodiments, the sensor is positioned between the caliper 105 and the brake pads 110. For the purposes of this disclosure, the sensor positioned between the caliper and the brake pads can include, for example, the sensor embedded in the caliper at a position at which the brake pads apply force to the caliper during braking. For example, the sensor 120 can be contained within the caliper walls adjacent to one or more of the brake pads 110. In one or more embodiments, the sensor 120 is coupled to an outer surface of the caliper 105. In various embodiments, the sensor 120 can include a plate positioned between the caliper 105 and one or more brake pads 110. The sensor 120 can be one or more different types of sensors, including, but not limited to piezoceramic, piezoelectric, capacitive, piezoresistive, strain gauges or other force or deformation sensors. In one or more embodiments, the sensor 120 can include a thermistor and is capable of measuring temperature.

The system 100 further includes a processor 125. In one or more embodiments, the processor 125 is located within or coupled to the caliper 105. In other embodiments, the processor 125 is located external to the caliper 105. The processor 125 can include a microprocessor capable of receiving and processing output signals from the sensor 120. In one or more embodiments, the processor 125 includes, or is coupled to, one or more wireless transceivers for receiving and transmitting output signals, analog conditioning units for conditioning the signals, analog/digital conversion units for converting the signals, and data processing units for processing data from the digital signals output by the sensor, transmission units for transmitting the processed data, and a memory for storing the processed data. In one or more embodiments, the processor 125 is configured to process the output signals to generate data regarding the force applied to the caliper and to determine a torque generated during braking. In one or more embodiments, the processor is configured to determine the torque substantially in real-time. Real-time, as disclosed herein, does not require strict instantaneous torque determinations. Rather, real-time includes the time it takes the processor 125 to receive and process the received output signals from the sensor 120 without significant delay. For example, real-time can include delays of up to Is, and may include delays of 100 ms or less.

In one or more embodiments, the processor 125 can be configured to review the determined torque generated during braking and instruct one or more of the caliper 105, the brake pads 110, or the rotor 115 to adjust to reduce or increase the torque generated during braking. For example, if the determined torque is very large, suggesting that the caliper 105 is contacting the brake pads 110 too tightly to the rotor 115 such that increased wear to the brake pads is likely, the processor 120 can transmit an instruction to the electronics overseeing the caliper functionality to instruct the caliper to cause the brake pads to contact with less force. Similarly, if the determined torque is low in a case where the pressing a braking pedal in the system 100 has a "spongy" or loose feel, the processor 120 can transmit an instruction to the electronics overseeing the caliper functionality to instruct the caliper to cause the brake pads to contact with more force.

In one or more embodiments, the processor 125 and the sensor 120 form an integrated module. For example, the processor 125 and the sensor 120 can form a module that is contained within the housing of the caliper 105 such that the sensor is near to where the tangential force is generated during braking, and such that the processor is near to the sensor to permit fast signal transfer and determination of torque.

The system 100 can be contained within a wheel apparatus, though it is not required to be within a wheel apparatus. For example, the system 100 can be included in braking arrangements that do not include wheels, such as treads. The wheel apparatus can include other conventional wheel parts, such as axles, tires, pistons, upright mounts, and the like. The system 100 can also be duplicated and included in multiple wheel apparatuses. In embodiments in which the system is duplicated in multiple wheel apparatuses, the respective sensors in each system can be configured to output signals representing measurements of force applied to each respective caliper by each respective brake pad when the brake pad contacts a respective rotor during braking. Thereafter, each of the output signals are received at one or more processors and processed to generate data regarding the forces applied to each respective caliper and to determine the respective torques generated at each wheel apparatus during braking. In one or more embodiments, the output signals from all sensors are received by a single central processor. In one or more embodiments, the output signals from each sensor are received by separate processors. Once a torque has been determined for each wheel apparatus, the respective torque measurements can be compared for the respective wheel apparatuses. In this way, the system can determine whether a particular wheel apparatus is receiving too much or too little force during braking relative to the other wheel apparatuses, which could indicate a potential or future braking system failure or malfunction. In one or more embodiments, the processor can be configured to determine the torques generated during braking for each wheel apparatus substantially in real-time.

Figure 2:
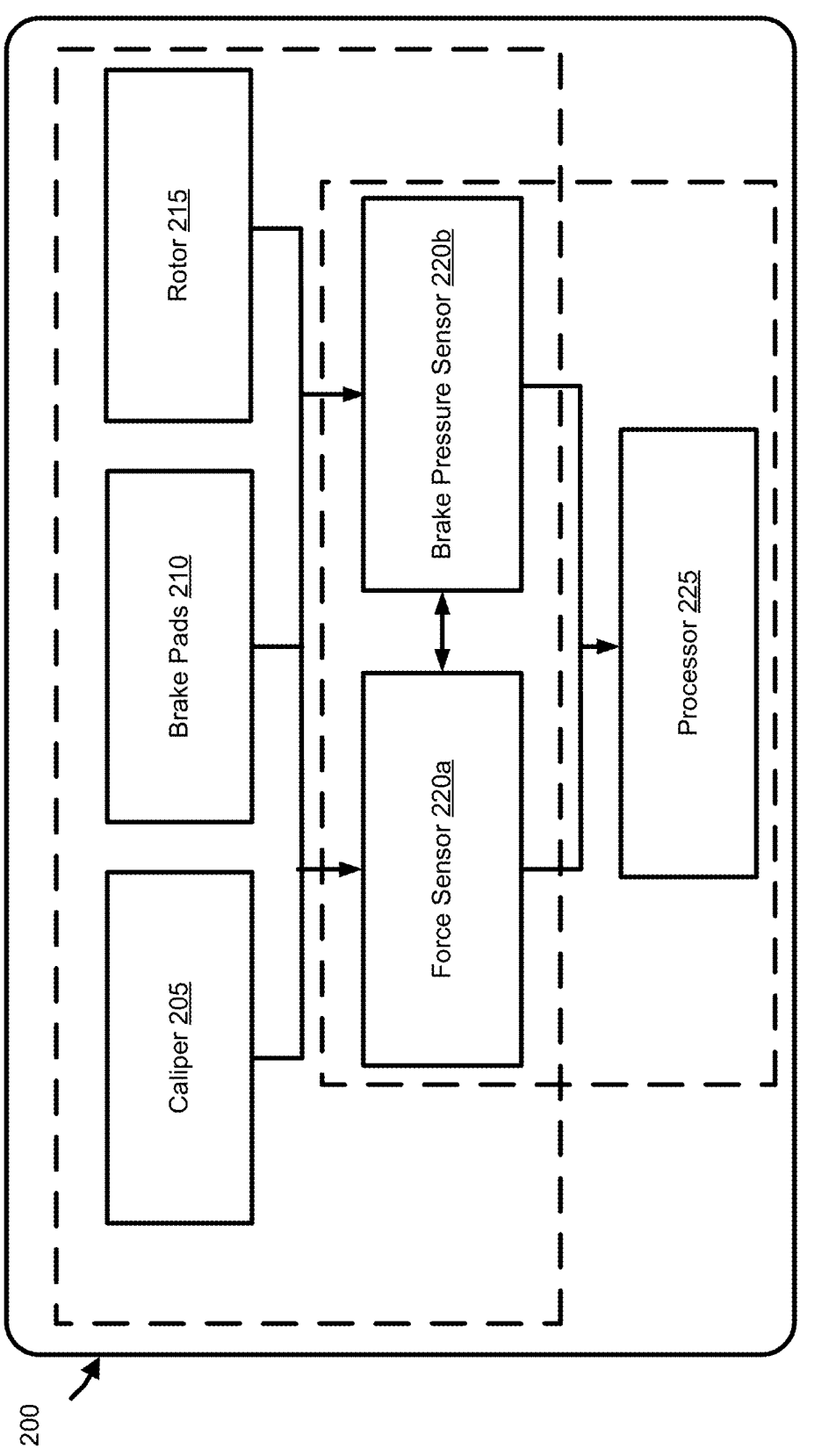
FIG. 2 illustrates an exemplary braking system according to one or more embodiments herein.
Figure 3:
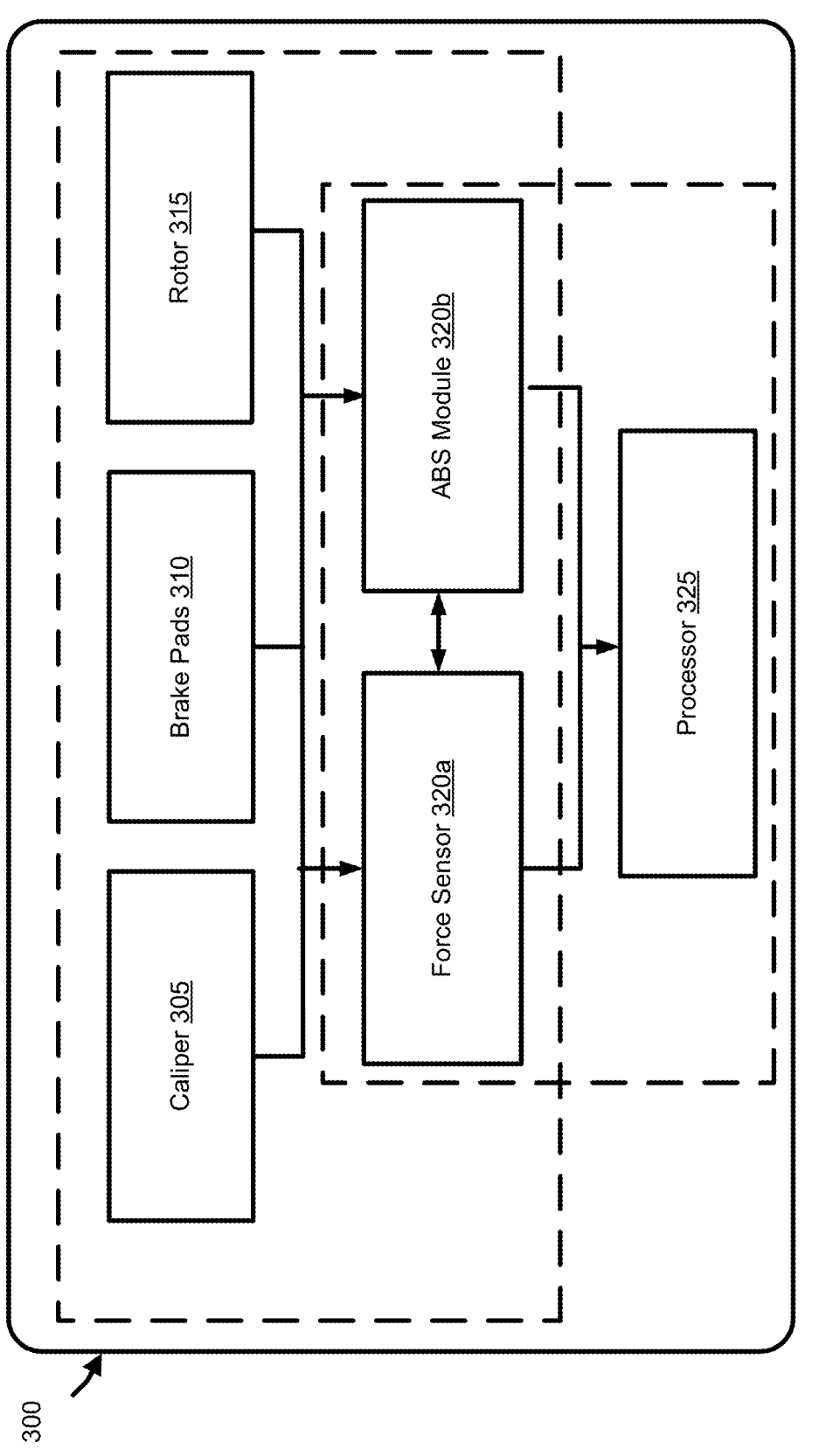
FIG. 3 illustrates an exemplary braking system according to one or more embodiments herein.
Figure 4:
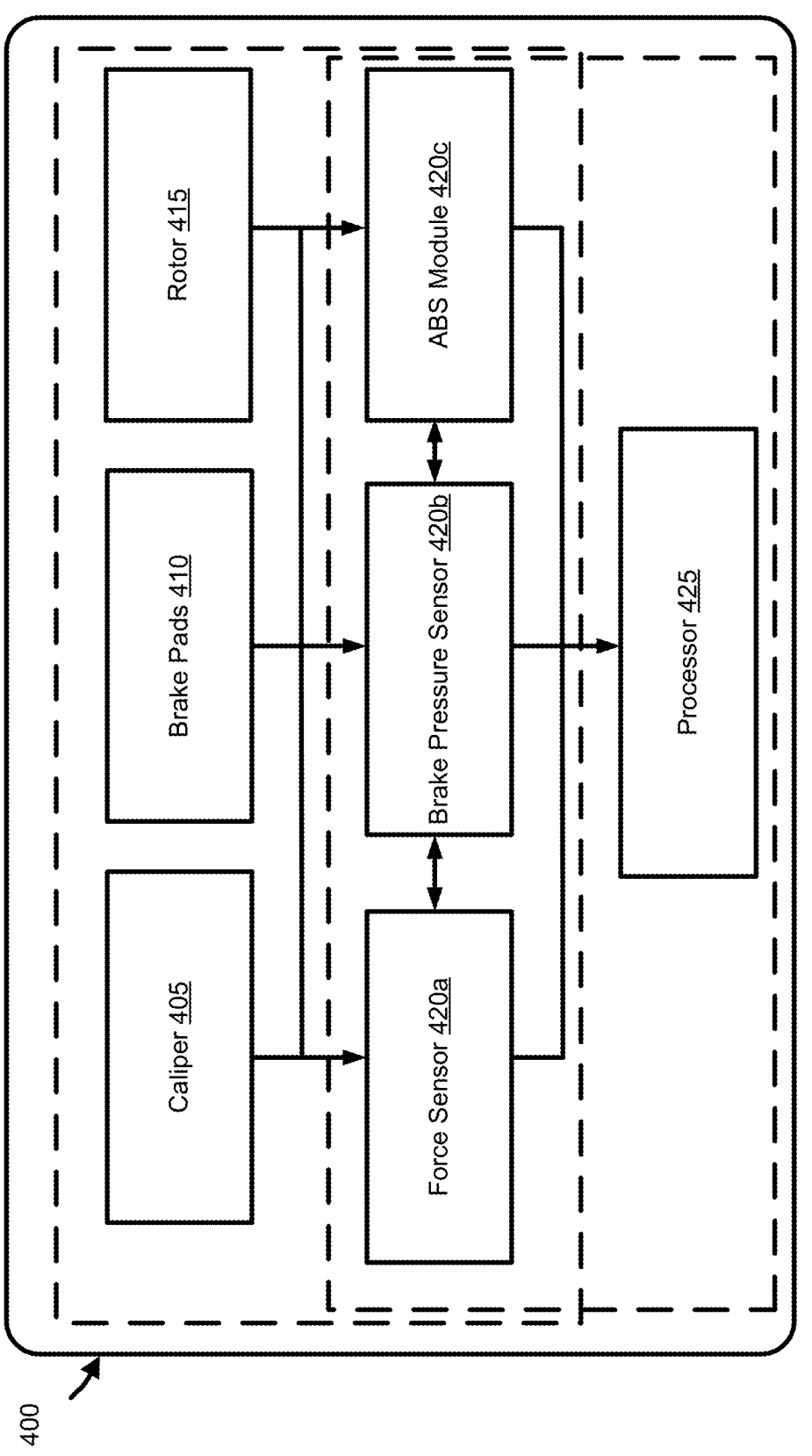
FIG. 4 illustrates an exemplary braking system according to one or more embodiments herein.

With reference now to FIGS. 2-4, FIGS. 2-4 illustrate additional exemplary braking systems according to one or more embodiments herein. The braking systems 200, 300, 400 include components that are similar to those in system 100, such as a caliper 205, 305, 405 (e.g., caliper 105), brake pads 210, 310, 410 (e.g., brake pads 110), rotor 215, 315, 415 (e.g., rotor 115), force sensor 220a, 320a, 420a (e.g., force sensor 120), and processor 225, 325, 425 (e.g., processor 125). However, these braking systems introduce different sensing components configured to make additional measurements. In particular, braking system 200 includes a brake pressure sensor 220b configured to output signals representing measurements of brake pressure (e.g., hydraulic pressure applied to the brake pads) and braking system 300b includes an anti-lock brake system (ABS) module 320b configured to output signals representing measurements of wheel lock up and/or wheel slip. Additionally, braking system 400 includes a force sensor 420a, a brake pressure sensor 420b, and an ABS module 420c that are each capable of outputting signals representing measurements of force, brake pressure, and wheel speed respectively. Each of braking systems 200, 300, 400 can be implemented in addition to, or in lieu of, system 100.

In operation, braking systems 200, 300, 400 function similarly to system 100, except that the measured physical property or properties are different and the processor can determine different qualities respect to braking. For example, braking system 200 includes brake pressure sensor 220b that outputs signals representing measurements of brake pressure, which are received and processed by processor 225 to generate data regarding the pressure applied to the brake pads, and thereafter the processor can be configured use both the measured force from the force sensor 220a and the measured brake pressure from the brake pressure sensor 220b to determine brake efficiency during braking. Brake efficiency is a function of the force applied by the brake pads to the caliper relative to the brake pressure applied by the brake pads to the rotor during braking. For example, if a high amount of brake pressure being applied by the brake pads to the rotor results in a low amount of force is being applied by the brake pads to the caliper, the braking is not very efficient. As a result, in various embodiments, the processor may determine the brake pads are "glazed" and are not creating the proper friction on the rotor (i.e., brake fading) and may warn the driver. In various embodiments, braking system 200 is capable of determining whether the brake pressure applied is generating sufficient restraining torque to cause the vehicle to slow or stop at a desired rate, or to keep a vehicle stationary that is positioned on a slope where the force of gravity would otherwise pull the vehicle down the slope. If the determined brake efficiency suggests that brake torque is decreasing against the same amount of brake pressure, the processor 225 can be configured to output a warning or message that the braking system might be failing. In one or more embodiments, processor 225 is configured to determine brake efficiency substantially in real-time.

In a further example, braking system 300 includes ABS module 320b that measures wheel speed (e.g., via a wheel speed sensor included in the ABS module) and detects when the wheel locks up, which is when the wheel speed suddenly decreases to zero during braking. Typically, this is caused by too much brake pressure being applied and can cause loss of control of the vehicle because when the wheels (tires) slide over the ground, the driver cannot easily steer the vehicle. In conventional ABS systems, when wheel lock up is detected, the ABS system controls the brake pressure to repetitively decrease and increase rapidly (e.g., 20 times per second) to allow the wheel to roll during the decreased brake pressure (which unlocks the wheel and allows the driver to steer) and to slow the vehicle during the increased brake pressure (which may cause the wheel to lock up briefly). However, conventional ABS systems rely on a compromise between letting the wheels unlock (which allows steering but provides no braking) and letting the wheels lock (which provides braking but does not allow steering).

In contrast, various embodiments may allow the braking force applied to be the maximum amount possible without causing the wheel to lock up. In other words, various embodiments may detect the amount of braking force that causes the wheel to lock up (the lock up braking force), and then control the braking force to be just below the lock up braking force. In this way, for example, various embodiments can allow maximum braking in combination with better steering control.

In the example embodiment shown in FIG. 3, the ABS module 320*b* operates by preventing the wheels from locking up during braking and sustaining traction with the surface—i.e., by limiting wheel slip. In one or more embodiments, the ABS module 320*b* can include one or more wheel speed sensors, one or more hydraulic valves, a pump, and a controller. For example, the ABS module 320*b* can include four wheel speed sensors and at least two hydraulic valves. In addition, ABS module 320*b* can receive force measurement input from force sensor 320*a*. In one or more embodiments, the controller is processor 325. In one or more embodiments, the controller is a processor separate from processor 325. In one or more embodiments, ABS module 320*b* can include or be in electronic communication with one or more steering wheel angle sensors and/or gyroscopic sensors. Steering wheel angle sensors and gyroscopic sensors provide output signals relating to the physical orientation of the steering wheel and other portions of the braking system 300 or the vehicle generally. For example, if a steering wheel angle sensor senses that the steering wheel is oriented by a user to direct a left turn, but the gyroscopic sensors are outputting signals indicating that the vehicle is not making the left turn, the ABS module 320*b* can instruct the brake pads 310 to contact the rotor 315 to brake necessary individual wheels to correct the direction of the vehicle to match the data output by the steering wheel angle sensor.

Via output signals sent by the wheel speed sensors and force sensor 320*a* to, and processed by, the controller, the ABS module 320*b* can continuously monitor the rotational speed and/or acceleration of a wheel in a wheel apparatus. ABS module 320*b* can continuously receive and monitor force measurement input from force sensor 320*a*. As the driver applies the brake on a slippery surface and the wheel locks up, the ABS module 320*b* can detect the wheel lock up and can determine the brake force at which the lock up occurred. The ABS module 320*b* can then control the brake pressure to cause a brake force that is just below the brake force that caused the wheel lock up. In this way, for example, the ABS module 320*b* can use the brake force measurement from force sensor 320*a* to apply the maximum braking force that will not cause the wheel to lock up. If the wheel locks up again, e.g., because the road surface becomes more slippery, the ABS module 320*b* may decrease the brake pressure and monitor the brake force measurement until the wheel unlocks and begins rotating again. At this time, the ABS module 320*b* may reset the maximum braking force based on the force measurement that allowed the wheel to spin. On the other hand, it is possible that the road surface becomes less slippery as the vehicle moves forward during braking. In this case, the maximum brake force can increase, and it would be advantageous for the ABS module 320*b* to increase the brake pressure accordingly. In order to detect this situation by, for example, periodically increasing the brake pressure gradually until the wheel locks again, then slightly reduce the brake pressure to just below the newly-determined maximum brake force. The ABS module 320*b* may "test" the maximum brake force, for example, every few seconds, every one second, every half-second, or other time period. In various embodiments, the ABS module 320*b* may control the brake pressure by actuating the valves to reduce or increase hydraulic pressure at the affected wheel as needed to achieve the determined maximum brake force. These processes may be repeated continuously and over very short durations (e.g., hydraulic pressure can be adjusted in less than one second). In one or more embodiments, the ABS module 320*b* can be set to activate only if the wheel rotation speed drops or increases above a set threshold. For example, wheels may not rotate at the same speeds during turning.

In a further example, braking system 400 includes a caliper 405, brake pads 410, a rotor 415, a force sensor 420*a*, a pressure sensor 420*b*, an ABS module 420*c*, and a processor 425. These components function similarly as disclosed elsewhere herein such that the processor 425 can receive output signals from each of the force sensor 420*a*, the pressure sensor 420*b*, and the ABS module 420*c* relating to tangential or other force, hydraulic pressure, and wheel rotational speed. Further, ABS module 420*c* can receive force measurement input from force sensor 420*a* and/or brake pressure measurement input from brake pressure sensor 420*b*. The processor 425 may perform various comparisons between the measured physical properties of the braking system 400 including torque, braking efficiency, and wheel lock up. These physical properties can also be compared to one another in order to perform additional diagnostics, such as the following examples.

By comparing a determined torque (e.g., determined from the brake force measurement) and wheel lock up, the system 400 can determine if the wheel lock up was due to degradation of the braking system (i.e., the lock up was caused by a lack of torque), or external conditions (e.g., icy/wet patches, a slip angle, etc.). Additionally, the system 400 can adjust the braking components to reduce the amount of determined torque based on determined wheel lock up to stay below a threshold level of wheel lock up.

By comparing a determined torque and a brake pressure caused by a brake pad force (i.e., how hard the brake pads 410 are pressing against the rotor 415), system 400 can determine a braking power. If a determined braking power is below a threshold, the system 400 can make a determination that the brakes are fading or failing.

By comparing wheel deceleration and wheel speed with steering wheel angle sensor information, the system 400 can determine if the wheels are braking in accordance with the orientation of the steering wheel and thus the direction of the car. If the steering wheel angle sensor data is not matching the measured wheel deceleration and/or wheel speed, the system 400 can make a determination that the brakes are fading or failing.

By comparing determined torque and brake pressure, the system 400 can determine if the activation of brake pressure is matching the expected output torque. In this way, the system 400 can provide control loop feedback.

In one or more embodiments, the braking systems disclosed herein (e.g., system 100, 200, 300, 400) can be coupled to additional braking systems located in a vehicle. For example, conventional vehicles have four wheel apparatuses, and each can have a braking system. The braking systems in each wheel apparatus can be independent of one another, coordinated, or a combination thereof. That is, each wheel apparatus can include a caliper configured to house a brake pad and a sensor positioned between the caliper and the brake pad and configured to output signals representing measurements of force, pressure, wheel speed, wheel acceleration, or other physical properties applied to the caliper by the brake pad when the brake pad contacts a rotor during braking. Each wheel apparatus can also include a processor configured to receive the output signals from the sensor, process the output signals to generate data regarding the force, pressure, wheel speed, wheel acceleration, or other physical properties applied to the caliper, and make relevant determinations for braking diagnostics, such a torque, braking efficiency, or wheel lock up generated during braking for each wheel apparatus. In one or more embodiments, a single processor receives the output signals from sensors in each wheel apparatus. In one or more embodiments, multiple processors receive the output signals from sensors in each wheel apparatus.

Figure 5A:
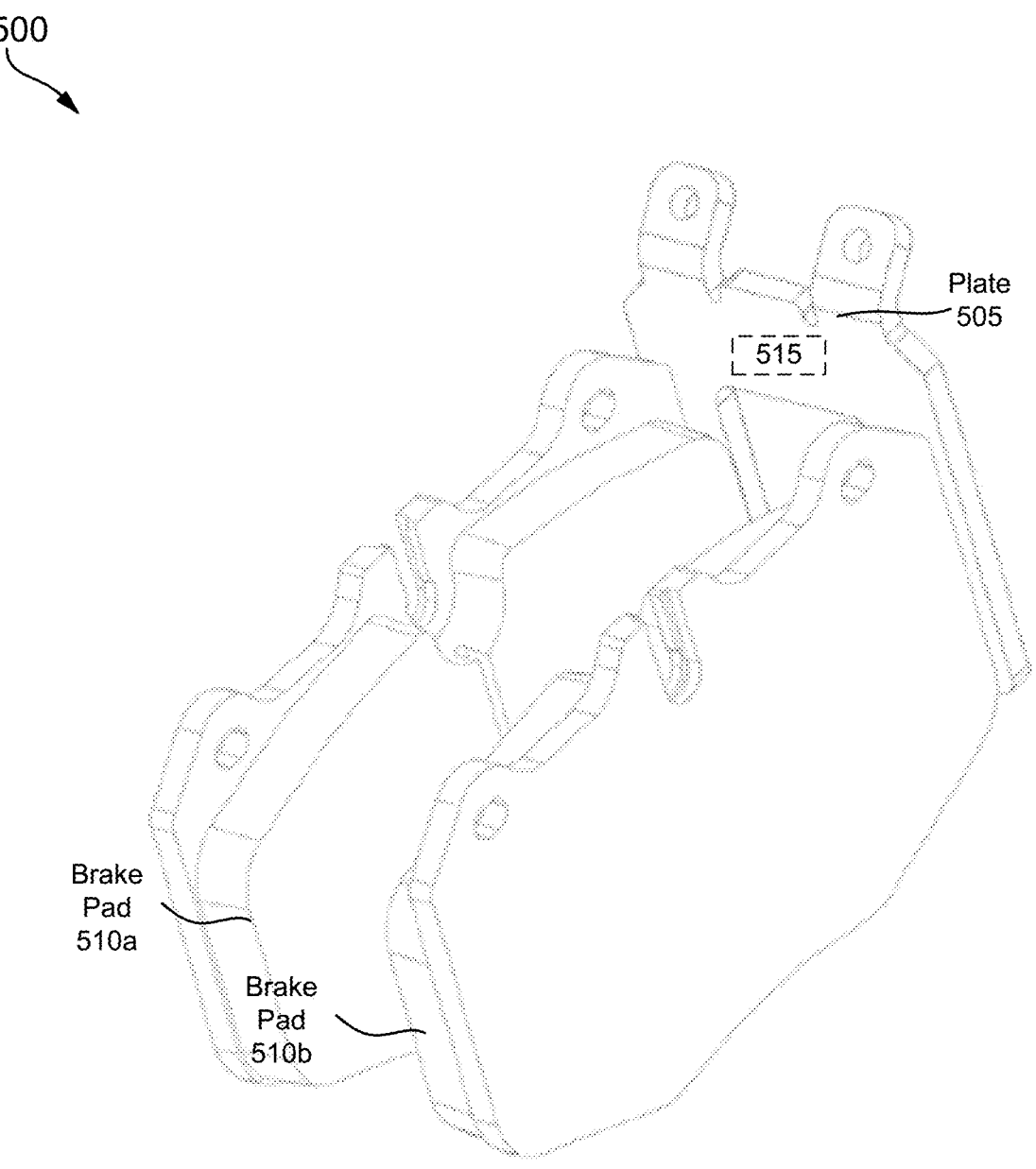
FIGS. 5A-5B illustrate an exemplary braking apparatus according to one or more embodiments herein.
Figure 5B:
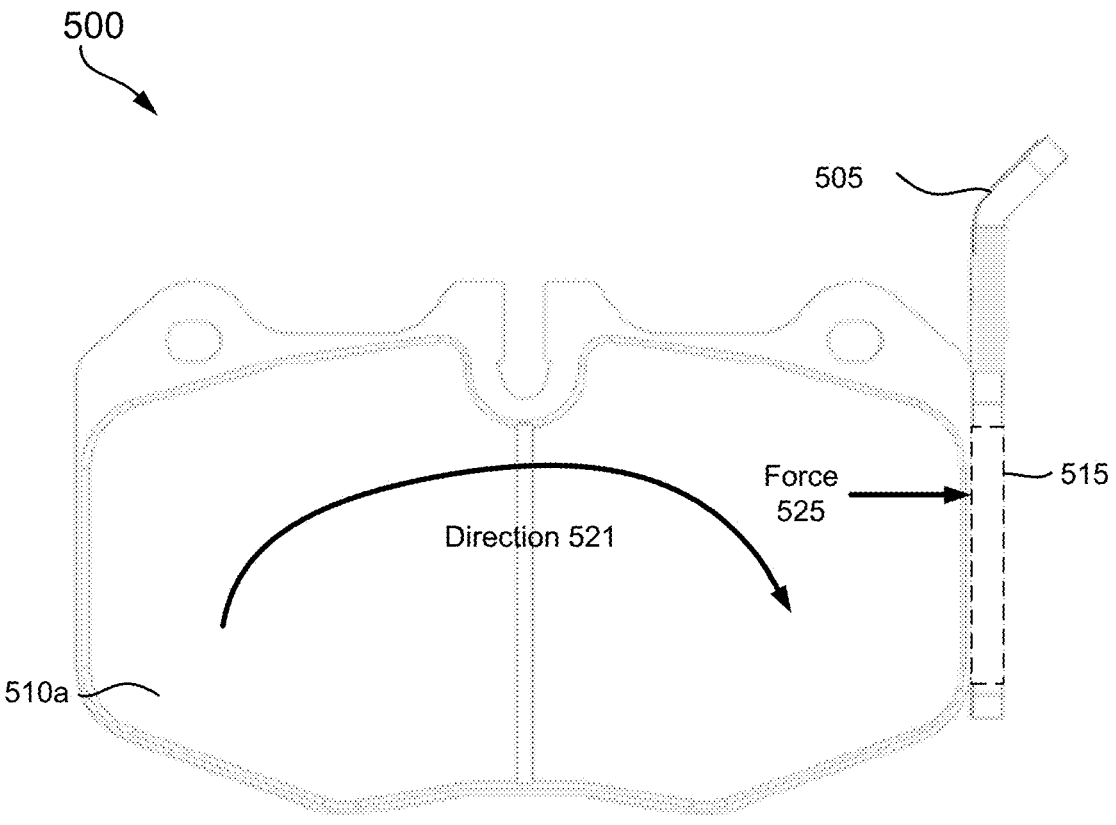

FIGS. 5A-5B illustrate an exemplary braking apparatus 500 according to one or more embodiments herein. The braking apparatus 500 can include a plate 505 adjacent to one or more brake pads 510a, 510b. The plate 505 can be a load-sensing plate. In one or more embodiments, the plate 505 is an integral part of the caliper housing. For example, the plate 505 can act as stopper for the brake pads 510a, 510b, without interfering with the traditional functioning of the brake. In one or more embodiments, the plate 505 is coupled to the caliper housing. In one or more embodiments, the plate is coupled to the wheel upright. The plate 505 further includes a sensor 515. The sensor 515 can be a force sensor, a pressure sensor, a speed/acceleration sensor, thermistor, or other sensor as disclosed herein. In one or more embodiments, when the brakes are activated by the driver or the hydraulic circuit, the brake pads 510a, 510b will contact a brake rotor (not shown), which is spinning in direction 521 of rotor rotation, and cause a force 525 to the plate that is measured by the sensor 515. The elastic deformation of the plate under loading can be used to determine the amount of force being transmitted during braking and therefore braking torque being generated and transmitted to ground can be calculated (e.g., by a processor as disclosed herein).

Figure 6A:
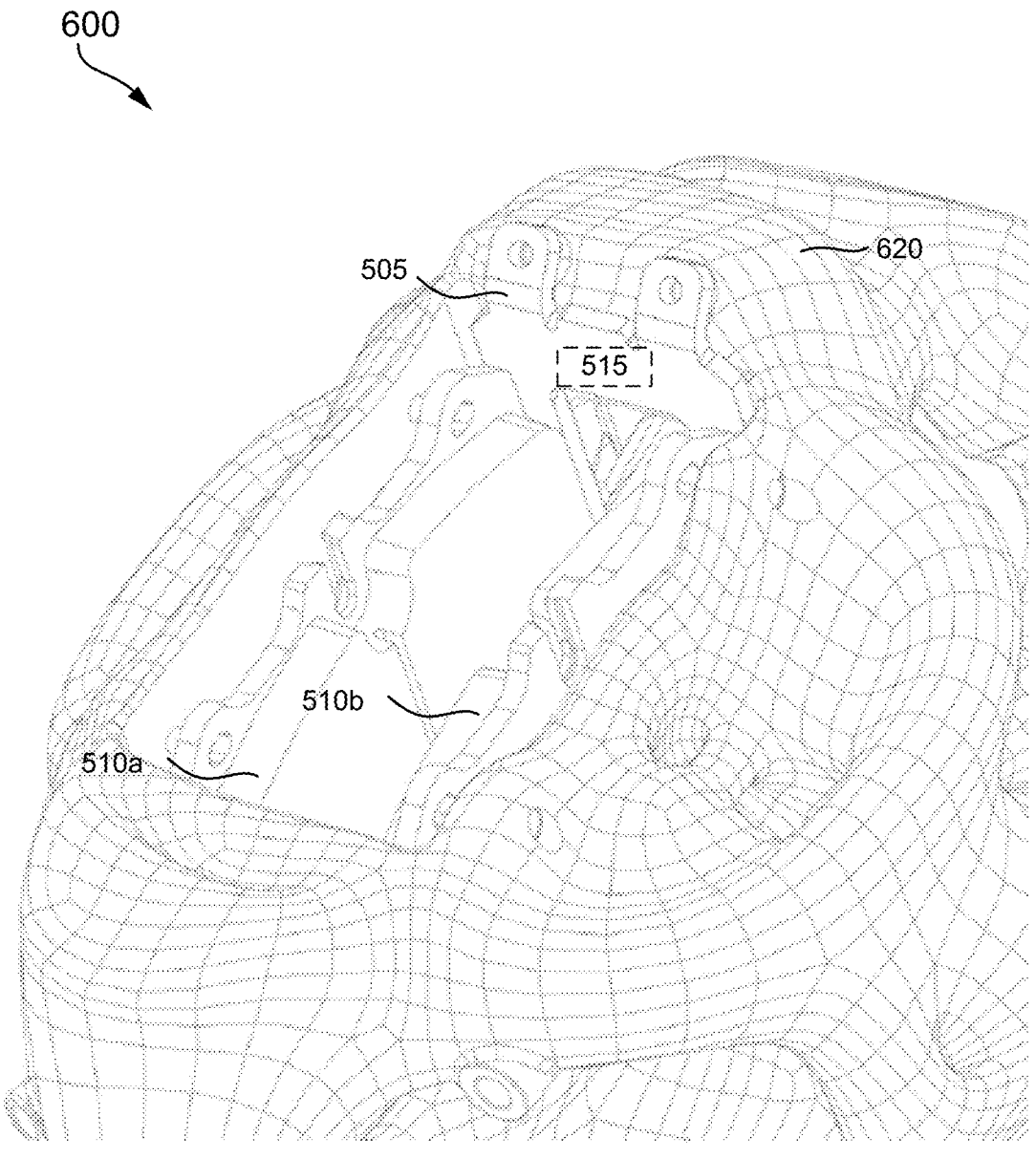
FIGS. 6A-6C illustrate the exemplary braking apparatus of FIGS. 5A-5B in an exemplary braking system.
Figure 6B:
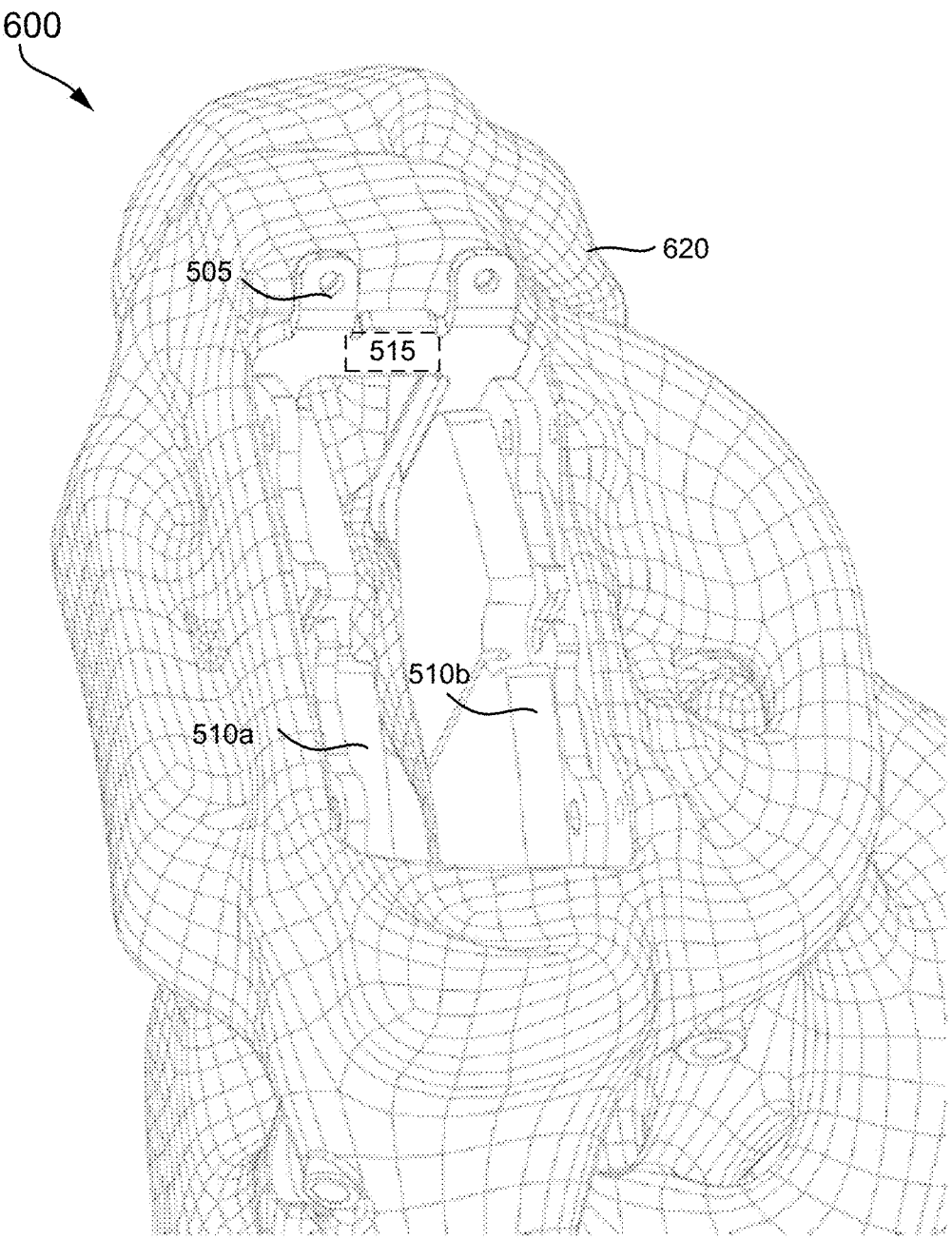
Figure 6C:
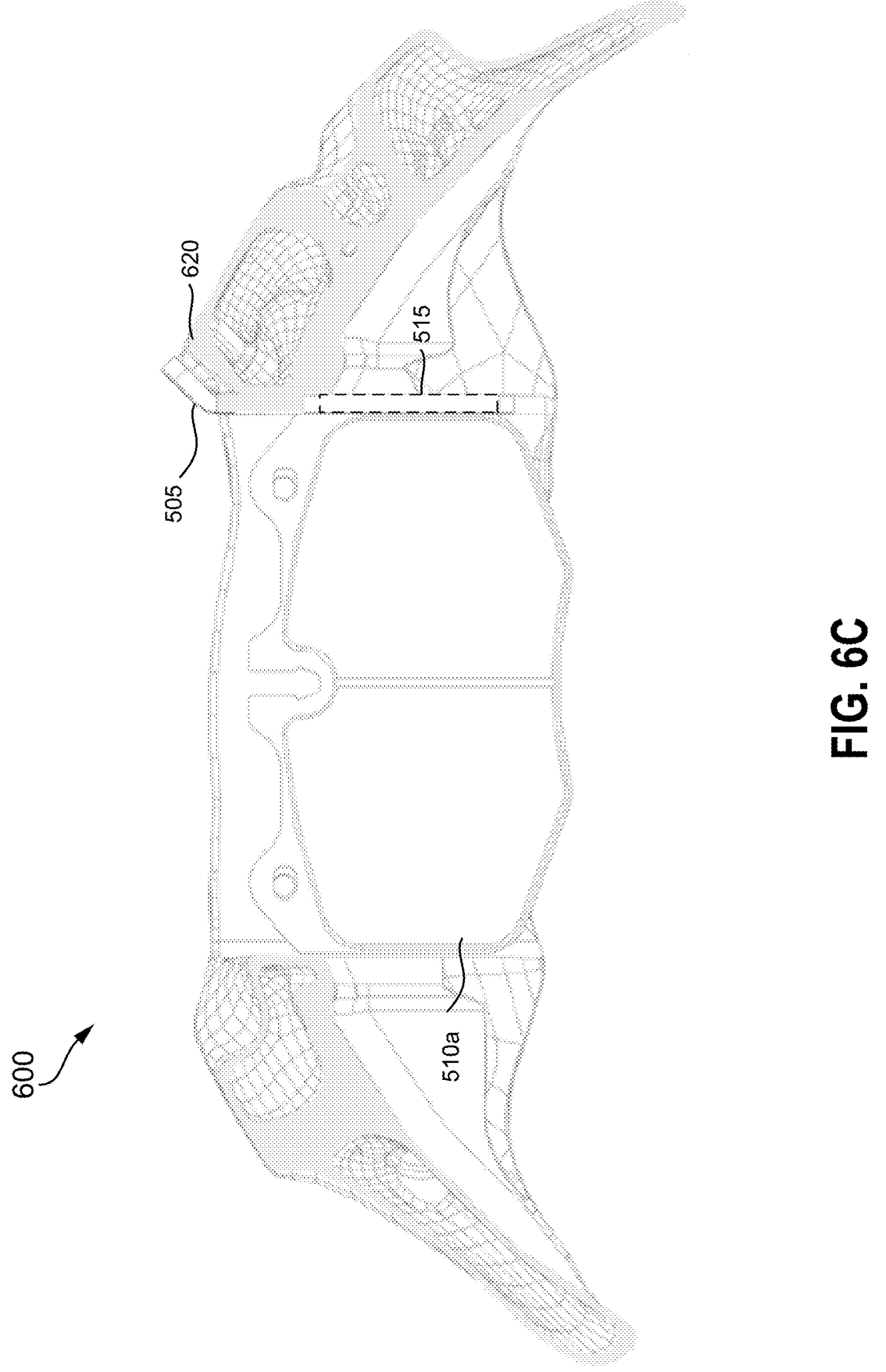

FIGS. 6A-6C illustrate the exemplary braking apparatus 500 of FIGS. 5A-5B in an exemplary braking system 600. The braking system 600 includes an integrated brake node 620 that the braking apparatus 500 is installed into. In one or more embodiments, the integrated brake node 620 can be a single-piece caliper and wheel upright construction. The integrated brake node 620 can additively manufactured (i.e., three-dimensionally printed) according to premade design files, such as CAD files. In one or more embodiments, the sensor 515 is configured to measure force, pressure, temperature, and other physical properties of the integrated brake node 620 during braking operation.

Figure 7:
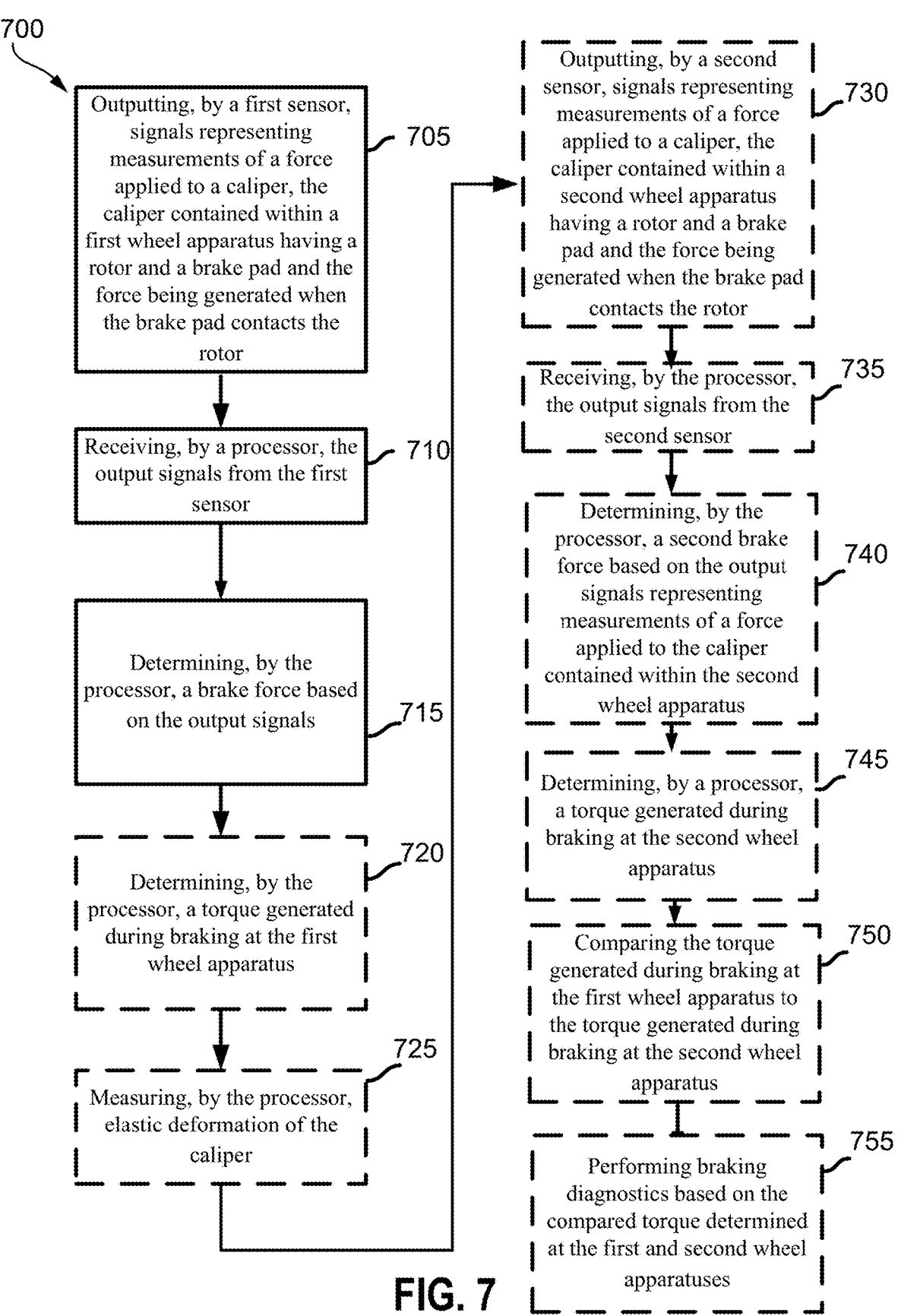
FIG. 7 is a flowchart of an exemplary method of measuring braking torque generated at a wheel apparatus during braking according to one or more embodiments herein.

FIG. 7 is a flowchart of an exemplary method 700 of determining torque generated during braking of a braking system (e.g., system 100, 400) according to the disclosure provided herein. Referring first to 705, the method 700 includes outputting, by a first sensor, signals representing measurements of a force applied to a caliper, the caliper contained within a first wheel apparatus having a rotor and a brake pad and the force being generated when the brake pad contacts the rotor. For example, the force may be generated when the brake pad contacts the rotor during braking, when a malfunction causes the brake pad to touch the rotor while not braking, etc. The first wheel apparatus can be any type of wheel on a vehicle, including a front or rear wheel on either side of a vehicle. At 710, a processor receives the output signals from the first sensor. The processor can be any microprocessor as is known in the art that can be configured to receive and process sensor output. The method continues by determining, by the processor, a brake force based on the output signals, i.e., the force applied to the caliper by the brake pad, 715. In one or more embodiments the data generated regarding the force applied to the first wheel apparatus concerns tangential force. Thereafter, the method 700 may determine, by the processor, a torque generated during braking at the first wheel apparatus, 720. The generated torque can be as a result of braking operation (i.e., contacting of brake pads to a rotor), or can be as a result of off-braking conditions due to unintended rubbing of the brake pads against the rotor (i.e., residual drag torque).

In one or more embodiments, the method 700 continues and measures, by the processor, elastic deformation of the caliper, 725. Elastic deformation can be measured in terms of flex of the caliper from a rest position to a position during braking caused by the force of braking. For example, the brake force may be determined based on the elastic deformation.

In one or more embodiments, the method 700 can include outputting, by a second sensor, signals representing measurements of a force applied to a caliper, the caliper contained within a second wheel apparatus having a rotor and a brake pad and the force being generated when the brake pad contacts the rotor, 730. As contemplated elsewhere herein, the method 700 can monitor braking in multiple wheel apparatuses simultaneously. At 735, these output signals are received by a processor from the second sensor. In one or more embodiments, the processor that receives the output signals from the second sensor is the same processor that receives the output signals from the first sensor. In one or more embodiments, the processor that receives the output signals from the second sensor is a different processor from the one that receives the output signals from the first sensor. The processor that receives the output signals of the second sensor thereafter determines a second brake force based on the output signals representing measurements of a force applied to the caliper contained within the second wheel apparatus, 740. Thereafter, at 745, the processor can determine a torque generated during braking at the second wheel apparatus. In one or more embodiments, the method 700 continues and compares the torque generated during braking at the first wheel apparatus to the torque generated during braking at the second wheel apparatus, 750. In one or more embodiments, the method 700 continues and performs braking diagnostics based on the compared torque determined at the first and second wheel apparatuses, 755. For example, based on the measured torque and the expected torque, braking diagnostics can include analyzing brake pad wear and the possibility that the braking system is fading, failing, or otherwise malfunctioning.

With reference now to FIG. 8, a flowchart of an exemplary method 800 of determining brake efficiency during braking of a braking system (e.g., system 200, 400) according to the disclosure herein is provided. Referring first to 805, the method 800 includes outputting, by a first sensor, signals representing measurements of a force applied to a caliper, the caliper contained within a first wheel apparatus having a rotor and a brake pad and the force being generated when the brake pad contacts the rotor. For example, the force may be generated when the brake pad contacts the rotor during braking, when a malfunction causes the brake pad to touch the rotor while not braking, etc. The first wheel apparatus can be any type of wheel on a vehicle, including a front or rear wheel on either side of a vehicle. At 810, a processor receives the output signals from the first sensor. The processor can be any microprocessor as is known in the art that can be configured to receive and process sensor output. The method continues by determining, by the processor, a brake force based on the output signals, i.e., the force applied to the caliper by the brake pad, 815. The method 800 can continue at 820 and outputs, by a second sensor, signals representing measurements of brake pressure on a caliper contained within a first wheel apparatus having a rotor and a brake pad and the brake pressure being generated when the brake pad contacts the rotor. For example, the brake pad may contact the rotor during braking. These output signals representing measurements of brake pressure from the second sensor can be received by a processor, 825. Thereafter, the processor can process the output signals representing measurements of brake pressure to generate data regarding the pressure applied to the brake pad, 830. At 835, the processor determines, based on the brake force and the brake pressure, a brake efficiency generated during braking.

Optionally, the method 800 can continue and perform braking diagnostics based on the determined brake efficiency, 840. For example, if the measured brake pressure is not efficiently generating a desired brake force, the braking diagnostics may come to a conclusion that the brake pads are wearing and are in need of change, or that the brake pads are not contacting the rotor correctly, or that the braking system is otherwise failing.

Figure 9:
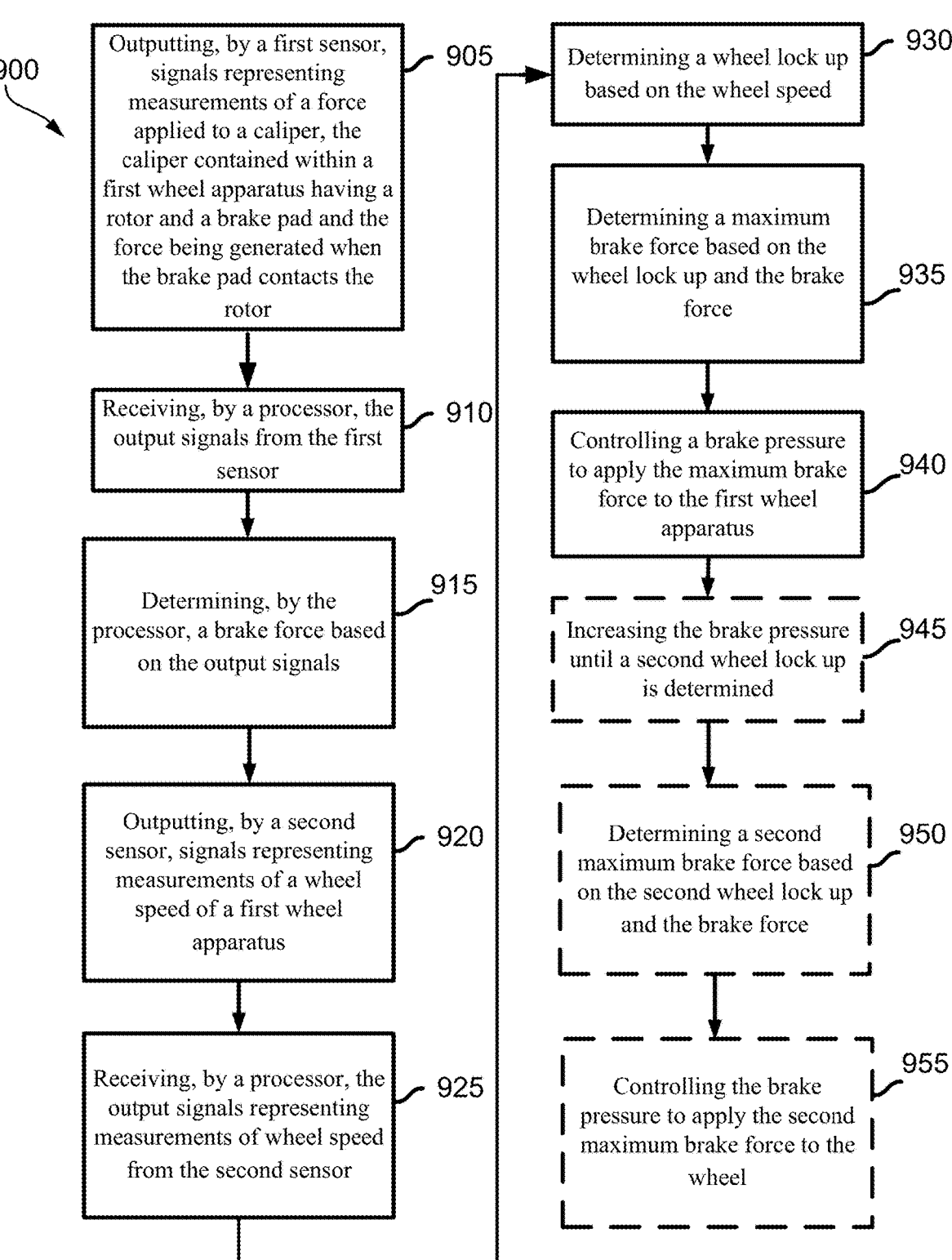
FIG. 9 is a flowchart of an exemplary method of measuring wheel speed generated at a wheel apparatus during braking according to one or more embodiments herein.

FIG. 9 is a flowchart of an exemplary method 900 of controlling an anti-lock braking during braking of a braking system (e.g., system 300, 400) according to the disclosure provided herein. Referring first to 905, the method 900 includes outputting, by a first sensor, signals representing measurements of a force applied to a caliper, the caliper contained within a first wheel apparatus having a rotor and a brake pad and the force being generated when the brake pad contacts the rotor. For example, the force may be generated when the brake pad contacts the rotor during braking, when a malfunction causes the brake pad to touch the rotor while not braking, etc. The first wheel apparatus can be any type of wheel on a vehicle, including a front or rear wheel on either side of a vehicle. At 910, a processor receives the output signals from the first sensor. The processor can be any microprocessor as is known in the art that can be configured to receive and process sensor output. The method continues by determining, by the processor, a brake force based on the output signals, i.e., the force applied to the caliper by the brake pad, 915.

The method 900 can continue at 920 by outputting, by a second sensor, signals representing measurements of a wheel speed of a first wheel apparatus. Thereafter, a processor receives the output signals representing measurements of wheel speed from the second sensor, 925. At 930, a wheel lock up is determined based on the wheel speed. Based on the wheel lock up and the brake force, a maximum brake force can be determined, 935. Thereafter, the method 800 continues and controls a brake pressure to apply the maximum brake force to the wheel apparatus, 940.

In one or more embodiments, the method 900 further increases the brake pressure until a second wheel lock up is determined, 945. At 950, the method 900 can determine a second maximum brake force based on the second wheel lock up and the brake force. Additionally, at 955, the method 900 can control the brake pressure to apply the second maximum brake force to the wheel.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other support structures and systems and methods for removal of support structures. Thus, the claims are not intended to be limited to the exemplary embodiments presented throughout the disclosure, but are to be accorded the full scope consistent with the language claims. Dashed-line elements in flowcharts are considered optional. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A system for a vehicle comprising:
a caliper configured to house a brake pad adjacent a rotor; and
a sensor separate from the brake pad, the sensor configured to be positioned between the caliper and the brake pad and configured to output signals representing measurements of force applied to the caliper by the brake pad when the brake pad contacts the rotor.

2. The system of claim 1, further comprising a processor configured to:
receive the output signals from the sensor,
process the output signals to generate data regarding the force applied to the caliper, and
determine a torque generated during braking.

3. The system of claim 2, wherein the processor is configured to determine the torque substantially in real-time.

4. The system of claim 2, wherein the processor is further configured to review the torque generated during braking and control a brake pressure applied to the brake pad to reduce or increase the torque generated during braking.

5. The system of claim 1, further comprising a second sensor configured to output signals representing measurements of a brake pressure, and further comprising a processor configured to:
receive the output signals representing the measurements of the brake pressure from the second sensor,
process the output signals representing the measurements of the brake pressure to generate data regarding the brake pressure applied to the caliper, and
determine, based on the output signals representing the measurements of the force and the output signals representing the measurements of the brake pressure, a brake efficiency generated during braking.

6. The system of claim 5, wherein the processor is configured to determine the brake efficiency substantially in real-time.

7. The system of claim 1, wherein the sensor is embedded in the caliper.

8. The system of claim 1, wherein the sensor is coupled to an outer surface of the caliper.

9. The system of claim 1, wherein the force is measured by measuring elastic deformation of the caliper.

10. The system of claim 1, further comprising the brake pad housed within the caliper.

11. A system for a vehicle comprising:
a first wheel apparatus and a second wheel apparatus, each of the first and second wheel apparatuses including;
a caliper configured to house a brake pad adjacent to a rotor; and a sensor separate from the brake pad, the sensor configured to be positioned between the caliper and the brake pad and configured to output signals representing measurements of force applied to the caliper by the brake pad when the brake pad contacts the rotor.

12. The system of claim 11, further comprising a processor configured to:

receive the output signals from the sensor, process the output signals to generate data regarding the force applied to the caliper, and determine a torque generated during braking for each of the first and second wheel apparatuses.

13. The system of claim 12, wherein the processor is further configured to compare the torque generated during braking for the first wheel apparatus to the torque generated during braking for the second wheel apparatus.

14. The system of claim 12, wherein the processor is configured to determine the torque generated during braking for each of the first and second wheel apparatuses substantially in real-time.

15. The system of claim 12, further comprising a second sensor configured to output signals representing measurements of a brake pressure at the first and second wheel apparatuses, and wherein the processor is configured to:

receive the output signals representing the measurements of the brake pressure at the first and second wheel apparatuses from the second sensor, process the output signals representing the measurements of the brake pressure at the first and second wheel apparatuses to generate data regarding the brake pressure applied to each caliper of the first and second wheel apparatuses, and determine, based on the output signals representing the measurements of the force and the output signals representing the measurements of the brake pressure, a brake efficiency of of each of the first and second wheel apparatuses generated during braking.

16. The system of claim 15, wherein the processor is further configured to compare the brake efficiency of the first wheel apparatus to the brake efficiency of the second wheel apparatus.

17. A method comprising:

outputting, by a first sensor, signals representing measurements of a force applied to a caliper, the caliper contained within a first wheel apparatus having a rotor and a brake pad, the first sensor separate from the brake pad, and the force being generated when the brake pad contacts the rotor;

receiving, by a processor, the output signals from the first sensor; and determining, by the processor, a first brake force based on the output signals.

18. The method of claim 17, further comprising:

determining, by the processor, a torque generated during braking at the first wheel apparatus, the torque being determined based on the first brake force.

19. The method of claim 17, further comprising measuring, by the processor, elastic deformation of the caliper, wherein the first brake force is determined based on the elastic deformation.

20. The method of claim 17, further comprising:

outputting, by a second sensor, signals representing measurements of a second force applied to a second caliper, the second caliper contained within a second wheel apparatus having a second rotor and a second brake pad, and the second force being generated when the second brake pad contacts the second rotor, receiving, by the processor, the output signals representing the measurements of the second force from the second sensor, and determining, by the processor, a second brake force based on the output signals representing the measurements of the second force applied to the second caliper contained within the second wheel apparatus.

21. The method of claim 20, further comprising:

determining, by the processor, a first torque generated during braking at the first wheel apparatus, the first torque being determined based on the first brake force, determining, by the processor, a second torque generated during braking at the second wheel apparatus, the second torque being determined based on the second brake force, and comparing, by the processor, the first torque generated during braking at the first wheel apparatus to the second torque generated during braking at the second wheel apparatus.

22. The method of claim 17, further comprising:

outputting, by a second sensor, signals representing measurements of brake pressure, receiving, by the processor, the output signals representing the measurements of the brake pressure from the second sensor, processing, by the processor, the output signals representing the measurements of the brake pressure to generate data regarding the brake pressure applied to the brake pad, and determining, based on the brake pressure and the first brake force, brake efficiency generated during braking.

23. The method of claim 17, further comprising:

outputting, by a second sensor, signals representing measurements of wheel speed, receiving, by the processor, the output signals representing the measurements of the wheel speed from the second sensor, determining a wheel lock up based on the wheel speed, determining a maximum brake force based on the wheel lock up and the first brake force, and controlling a brake pressure to apply the maximum brake force to the first wheel apparatus.

24. The method of claim 23, further comprising:

increasing the brake pressure until a second wheel lock up is determined, determining a second maximum brake force based on the second wheel lock up and the first brake force, and controlling the brake pressure to apply the second maximum brake force to the first wheel apparatus.

25. The system of claim 1, wherein the sensor is rigidly connected to a wheel carrier.

26. The system of claim 11, wherein each sensor of each of the first and second wheel apparatuses is rigidly connected to a respective wheel carrier.

27. The method of claim 17, wherein the first sensor is rigidly connected to a first wheel carrier.

* * * * *